NO PRINTED SPECIFICATION AVAILABLE
7178X
J. C. Writin.
Machine for Spreading and Picking Cotton.
Patented Jul. 20, 1832.
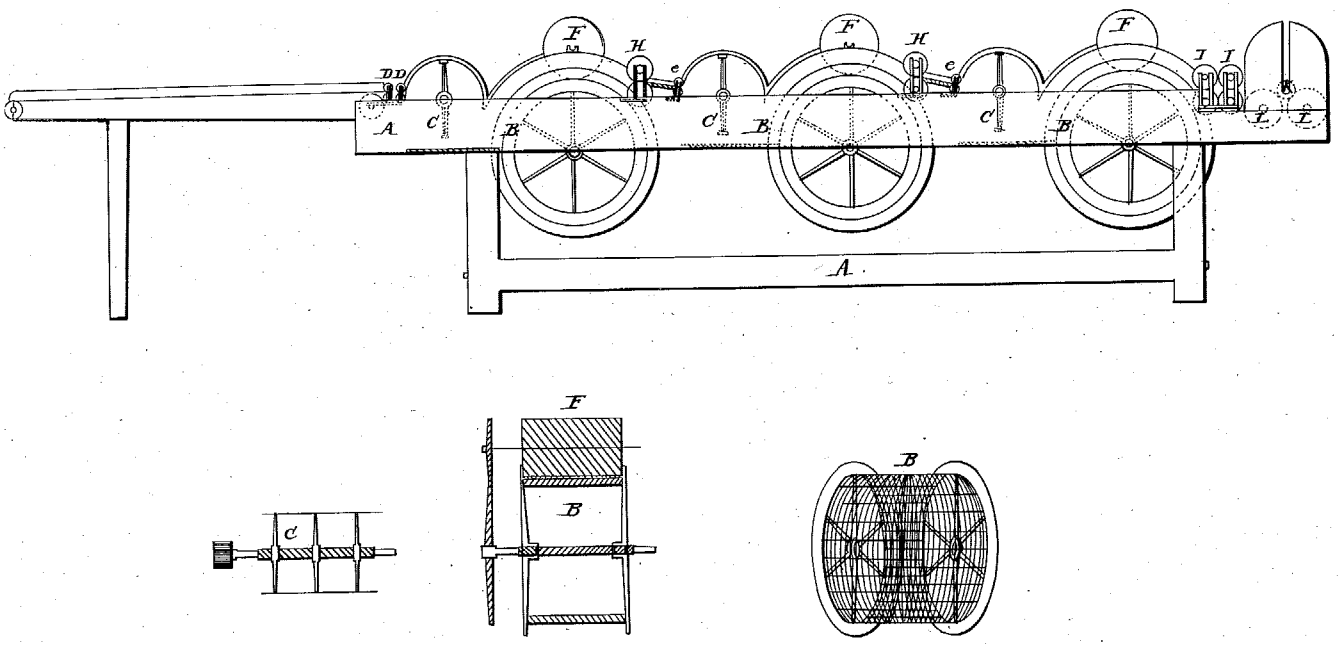

John C Whiton of Northbridge Massachusetts
Letters Patent.

The Schedule referred to in these Letters Patent and making part of the same containing a description in the words of the said John C Whiton himself of his improvement in the machine for spreading and Picking cotton.

To all whom these presents shall come. Be it known that I John Whiton of Northbridge in the County of Worcester and State of Massachusetts have invented a new and useful improvement in the spreading and picking machine, used in the preparation of cotton for the cards. and that the following is an exact description of the construction of said machine and of the improvement invented by your Petitioner for which he now requests Letters Patent of the United States. said machine consists of a cast iron, or wooden frame, of sufficient length to sustain the movements of the same including the apron or feeding cloth on which the cotton is placed in its raw state. said frame is denoted by the orange colour in the annexed drawing marked A A of three wire cylinders placed horizontally on the same. constructed with a flange or heading at each end of them of about two or three inches in width so as to retain the sheet of cotton or lap in suitable form and with a smooth compact edge in passing through the machine. Said cylinders are marked B.B.B; of three beaters one of which is placed before each of the wire cylinders marked C.C.C. of eight feeding Rolls, two pair of which are marked D.D. are placed between the apron or feeding cloth, and the first beater at about half an inch distance from each other, the pair next the Beater to revolve with a greater speed than the other so as to stretch the cotton moderately and give a right direction to the fibre or staple. The other two pairs marked E.E. are placed in front of the remaining two beaters. Of three wooden rolls or drums marked F.F.F. resting horizontally one on each of the wire cylinders so as to press down the cotton as it passes over the cylinders; Of two pair of rollers marked H H one of which is placed in the rear of the two first wire cylinders so as to conduct the cotton from the first and second cylinders to the second and third beaters. of two 490 7178X July 20, 1832 pair of rolls marked I I. to conduct the cotton from the third cylinder
to a wooden or metal roll marked K in which the cotton is rolled ready
for the operation of the card. Said last mentioned roll rests in its opera-
tion on two other rolls marked L L that compress the cotton and render
it more compact and convenient for subsequent operations.
At each end of the three last rolls are placed cast iron plates or boards
with smooth surfaces so as to keep the laps or rolls of cotton of the desi-
red and uniform width. Said movements are all to be geared excepting the
beaters which are operated by belting. So much of said movements as are
above the frame that supports them are cased so as to prevent any fly
or waste of cotton. The improvement in said spreading and pick-
ing machine invented by the Petitioner and for which he requests Let-
ters Patent is in the application of gearing to the several movements
instead of Belts and of the flange or rim to the ends of the several wire
cylinders Exd. Witnesses
[illegible] Bezaleel Taft
Hannah Taft John C. Whitin (644 [illegible])